Oct. 27, 1953 R. E. MARTENS ET AL 2,656,766

APPARATUS FOR PRODUCTION OF RELIEFS

Filed Feb. 16, 1951 4 Sheets-Sheet 1

INVENTORS
Lewis A. Whinnery
and Robert E. Martens
BY Mason, Fenwick & Lawrence
ATTORNEYS Oct. 27, 1953 R. E. MARTENS ET AL 2,656,766

APPARATUS FOR PRODUCTION OF RELIEFS

Filed Feb. 16, 1951 4 Sheets-Sheet 2

INVENTORS
Lewis A. Whinnery
and Robert E. Martens
BY Mason, Fenwick & Lawrence
ATTORNEYS Oct. 27, 1953 R. E. MARTENS ET AL 2,656,766

APPARATUS FOR PRODUCTION OF RELIEFS

Filed Feb. 16, 1951 4 Sheets-Sheet 3

INVENTORS

Lewis A. Whinnery and
Robert E. Martens

BY Mason, Fenwick & Lawrence

ATTORNEYS

Oct. 27, 1953 R. E. MARTENS ET AL 2,656,766

APPARATUS FOR PRODUCTION OF RELIEFS

Filed Feb. 16, 1951 4 Sheets-Sheet 4

INVENTORS
Lewis A. Whinnery
and Robert E. Martens
BY Mason, Fenwick & Lawrence
ATTORNEYS Patented Oct. 27, 1953 2,656,766

UNITED STATES PATENT OFFICE 2,656,766

APPARATUS FOR PRODUCTION OF RELIEFS

Robert E. Martens and Lewis A. Whinnery, Charleston, W. Va., assignors to Stone Crest Studios, Inc., Charleston, W. Va., a corporation of West Virginia Application February 16, 1951, Serial No. 211,392

2 Claims. (Cl. 90—13.5)

The present invention relates to apparatus for producing 3-dimensional relief models, and more particularly to translation apparatus for producing relief or contour terrain models from topographical maps, stereoscopic pairs of aerial photographs, prepared relief models and the like.

Reliefs, especially those of the type such as 3-dimensional contour models of terrain, have heretofore been produced by a number of methods, the majority of which derive the model by tracing elevation contour lines in a topographical map. One of the earliest methods is to trace out the outline of each single contour line representing an increment of elevation or altitude from a topographical chart or map onto separate pieces of cardboard. The traced outlines are then cut out along the contour lines and the several cuttings secured together to produce a well known step relief map.

Another process commonly employed is that of forming a relief by transferring the elevation contour lines from the flat topographical map onto a workable block of plaster or wax or the like, by means of a pantograph and a pencil or graver, the graver or reproducing point on the pantograph either shaping the block by working away the soft workable material thereof, or inscribing the elevation contour lines on the upper surface for subsequent cutting and shaping.

Another system for producing or reproducing the 3-dimensional contour terrain model has been to couple a machine-driven, vertically adjustable milling cutter, by means of a parallel motion mechanism or linkage, to a stylus or copying pin that is moved over the elevation contour lines of a topographical map or a relief model from which the model is derived. The milling cutter operates on a block of plaster of Paris, wax, wood, or the like, to cut away the portions of the block in contact with the milling cutter in accordance with the movement of the milling cutter and tracing stylus to produce the 3-dimensional relief model. As a variation on this system, milling cutters have been rigidly intercoupled with the tracing stylus to move as a unit and disposed for movement in a plane above the tracing stylus to operate on a work piece disposed above the topographical chart and cut out the work piece in conformity with movement of the stylus over the elevation contour lines.

It is to be noted that each of these aforementioned systems require that a topographical map of the area of terrain to be reproduced, having the contour lines of elevation increments inscribed thereon, be previously prepared as by reproduction and appropriate stereoscopic plotting from a stereoscopic pair of aerial photographs. It is likewise important to note that each of the above described reproducing systems, which are designed to operate on a block of workable material to cut out a 3-dimensional terrain model, involve complex mechanical linkages or couplings between the tracing and reproducing components of the assembly, accentuating the structural complexity of the device and severely limiting the operating characteristics of such systems insofar as scaling and production of multiple copies are concerned. Nor are such systems sufficiently flexible to permit reproduction of a 3-dimensional relief model from either aerial photographs, a topographical map, or another relief model.

An object of the present invention, therefore, is the provision of a novel apparatus for producing 3-dimensional relief models of terrain, characterized by simplicity and versatility of the position-reproducing means intercoupling the tracing and reproducing components thereof, elimination of complex mechanical linkages for transcribing tracing movements, and high fidelity reproduction.

Another object of the present invention is the provision of a novel apparatus for producing relief models of terrain, in which the relief can be made with equal accuracy and facility from either a topographical map of the area, a stereoscopic pair of aerial photographs, or another relief model.

Another object of the present invention is the provision of a novel apparatus for producing 3-dimensional relief models of terrain in which variation in scaling of the relief model to the topographical map or photographs from which the model is derived is facilitated.

Another object of the present invention is the provision of novel means for production of 3-dimensional relief models of terrain wherein the relief model and a topographical map may be simultaneously produced during parallax analysis of a stereoscopic pair of aerial photographs.

Another object of the present invention is the provision of a novel means for producing 3-dimensional relief models of terrain by tracing elevation contour lines from topographical maps or aerial photographs, wherein tracing movements are electrically translated to reproducing means, obviating the necessity of mechanical coupling and providing greater versatility in scaling and reproduction.

Another object of the present invention is the provision of a novel apparatus for the production of 3-dimensional relief models of terrain wherein a plurality of relief models may be simultaneously produced during tracing of elevation contour lines on topographical maps, stereoscopic photographs, master relief models and the like.

Another object of the present invention is the provision of a novel apparatus for the production of 3-dimensional relief models of terrain wherein a plurality of relief models bearing varying scaled relationships may be simultaneously produced during tracing of elevation contour lines on topographical maps, stereoscopic photographs, master relief models and the like.

Other objects, advantages and capabilities of the present invention will become apparent from the following detail description, taken in conjunction with the accompanying drawings, wherein only a preferred embodiment of the invention is illustrated.

Figures 1, 8:
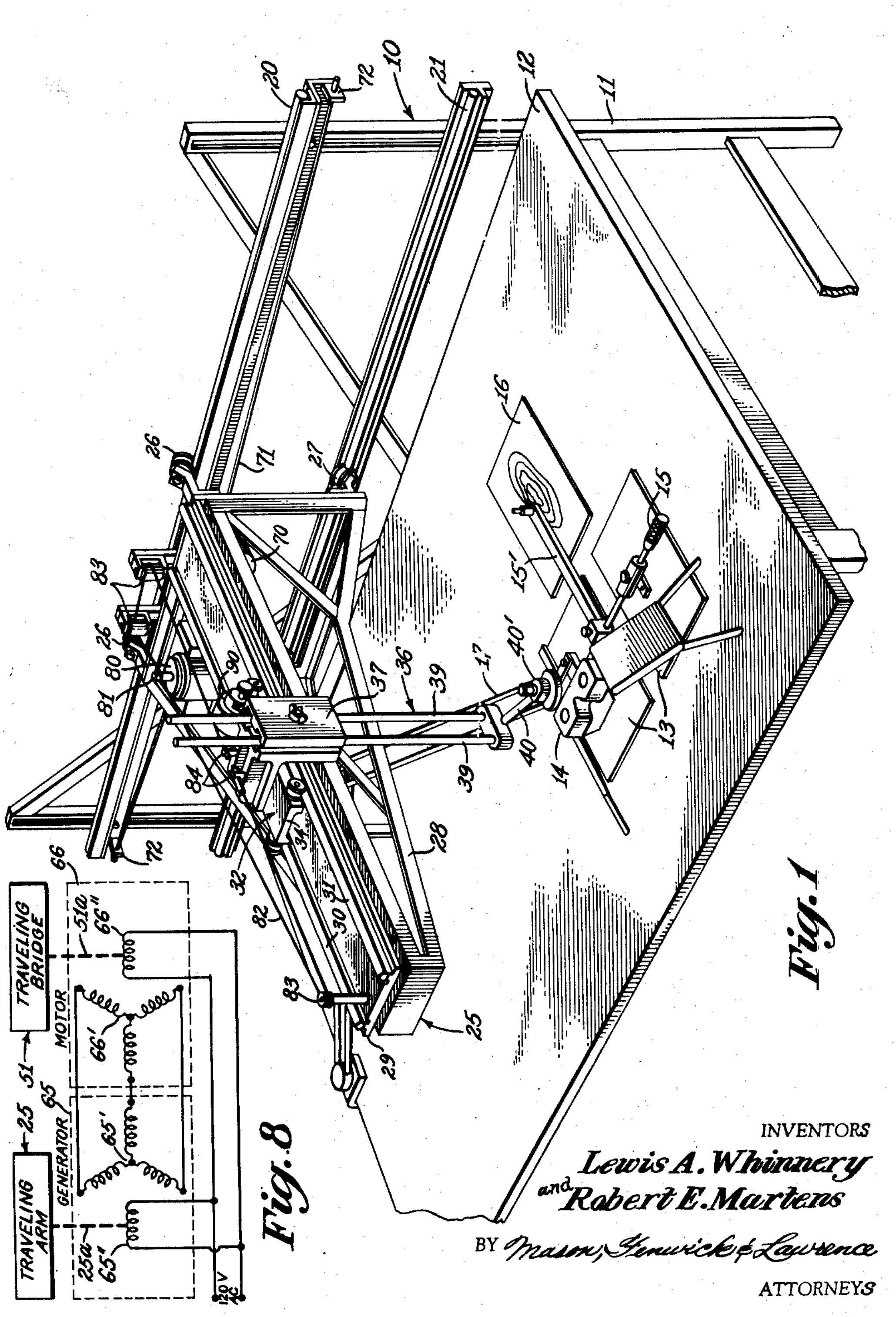
Figure 1 is a perspective view of the tracing unit employed in the 3-dimensional relief model reproduction system.
Figure 8 is a schematic diagram of the position-sensitive selsyn system circuit for reproducing tracer positions and movements relative to one coordinate axis.
Figure 2:
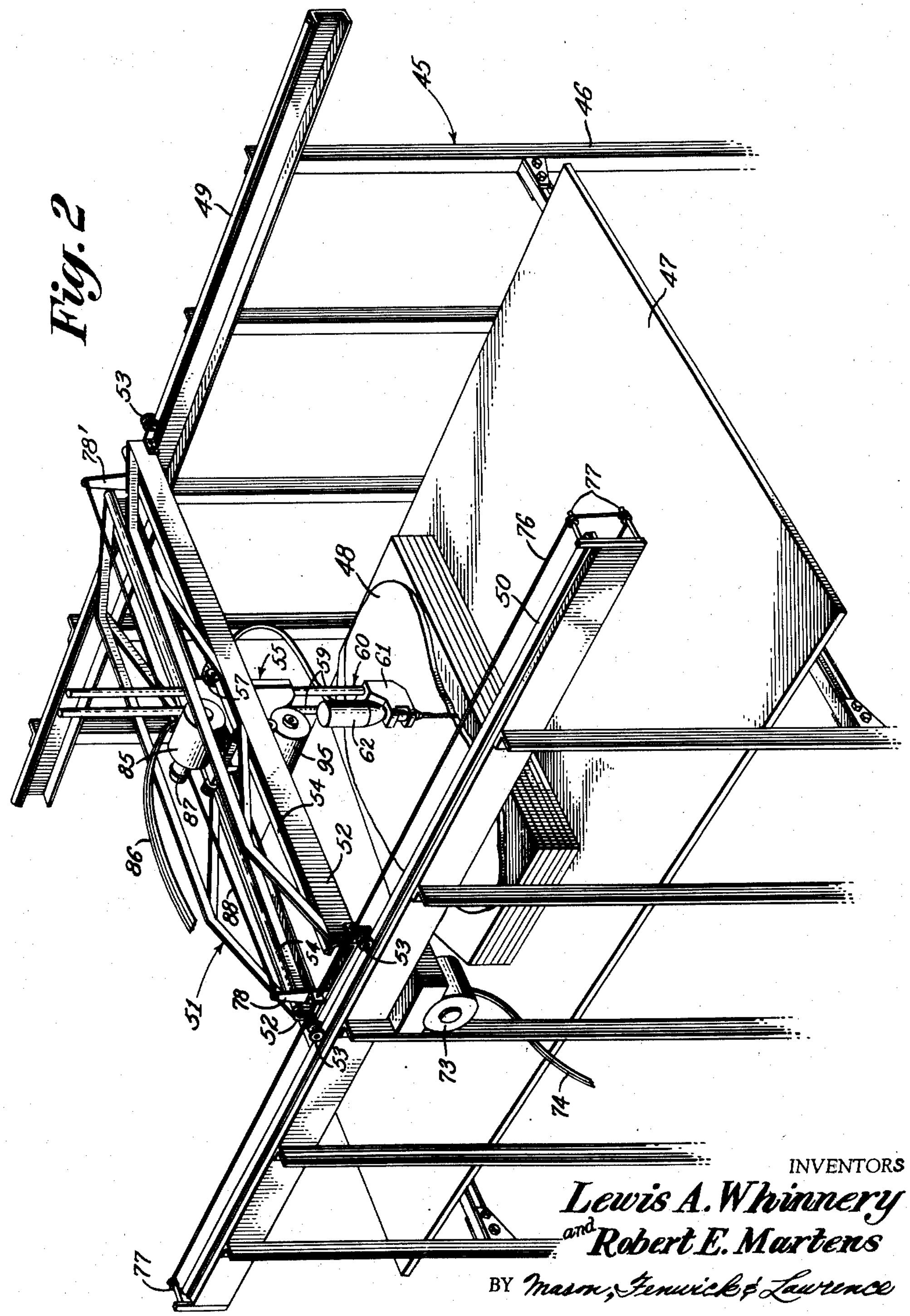
Figure 2 is a perspective view of the reproducing unit employed in the 3-dimensional relief model reproduction system.

The apparatus for producing 3-dimensional relief models of terrain from topographical contour maps, stereoscopic pairs of aerial photographs and the like, according to the present invention, requires two instruments, generally referred to as the tracing unit and the reproducing or cutting unit, illustrated generally in Figures 1 and 2, respectively. The tracing unit is arranged to produce position-sensitive electrical voltages in accordance with movement of a suitable stylus or other indicator about elevation contour lines derived from suitable plots or photographs of the area to be reproduced. The position-sensitive electrical voltages are intercoupled with electrical means which reproduce the position in the reproducing or cutting unit, to position a milling cutter or electrical drill relative to the longitudinal and transverse axes of the reproducing unit in accordance with movements of the stylus means in the tracing unit about the elevation contour lines. Appropriate scaling means may be incorporated in the electrical position reproducing means intercoupling the reproducing unit and the tracing unit to vary the scale of the relief model routed out by the milling cutter or drill in relation to the movements of the stylus means about the elevation contour lines in the plot or photograph. By means of the electrical intercoupling employed between the units, a plurality of independent reproducing or cutting units may be driven simultaneously from the same tracing unit by intercoupling the position reproducing means in parallel relation with the position-sensitive voltage generating means in the tracing unit.

Referring to the drawings wherein like reference characters refer to corresponding parts throughout the several figures, and particularly to Figures 1 and 3 to 5 inclusive, a tracing unit is provided, with which elevation contour lines necessary for the production of the relief model are traced out and portional electrical signals are generated for reproducing the tracing movements. The tracing unit, generally indicated by the reference character 10, comprises a frame 11, having upright framing members, upon which is mounted a horizontal tracing table 12. The tracing table 12 is adapted to support a topographical map of the area to be reproduced having elevation contour lines inscribed thereon, or a pair of aerial photographs comprising a stereoscopic pair of the area to be reproduced.

If the relief model is to be derived from a stereoscopic pair of aerial photos such as those indicated at 13 in Figure 1, the photographs are transversely arranged in a well-known manner relative to a preselected reference axis, and are viewed through a suitable stereoscopic viewer, indicated at 14, of well known type such as that disclosed in U. S. Patent No. 2,246,604, issued to J. W. Smith, June 14, 1941, or Patent No. 2,178,-324, issued to J. E. King et al., October 13, 1939. The function of the stereoscope 14 is to optically apportion the two photographs forming a stereoscopic pair of aerial photographs, which have been exposed from separated points in space, to the eyes of the observer so that each eye sees only one of the photographs, the images of the two photographs being combined in a well known manner to produce an apparent 3-dimensional image.

To produce motion corresponding to the elevation contour lines of the terrain in the 3-dimensional image, the photographs are subjected to parallax examination through the stereoscope by means of a parallax bar 15, which is an instrument of well known design for producing an image of a spot which may be adjusted as to apparent elevation in the field of the 3-dimensional image produced from the pair of photographs, the parallax bar being, for example, of the type disclosed in U. S. Patent No. 1,999,236, granted to G. Hess, April 30, 1935, and U. S. Patent No. 2,104,778, granted to B. B. Talley, January 11, 1938. The parallax bar 15 is of the micrometer adjustment type having a rigid perpendicular arm 15' adapted to support a pencil or other writing implement and trace the movements of the parallax bar 15 during parallax examination of the aerial photographs 13. The tracings thus produced form the elevation contour lines of the terrain to produce the topographical plot or map such as illustrated at 16 in Figure 1. To this end, one end of the parallax bar 15 is coupled to a conventional type of a universal drafting arm 17 suitably secured to one end of the tracing table 12 to maintain the parallax bar 15 continuously oriented parallel to a preselected reference axis during movement thereof.

For convenience in describing the various components of this apparatus for translating position and motion, the longitudinal axis of the tracing table 12 is that which is generally parallel to the shaft of the parallax bar 15 as viewed in Figure 1, and the transverse axis is that which is parallel to the perpendicular arm 15' of the parallax bar 15 as viewed in Figure 1.

In order to accommodate longitudinal movement about the area of the tracing table 12, a pair of horizontal guide rails 20 and 21 are disposed one above the other in vertically spaced relation along one end of the tracing table 12 and parallel to the longitudinal axis thereof. To accommodate vertical adjustment of the guide rails 20, 21, the rails may be coupled to upright members of the frame 11 by means of bolts or like securing means extending through vertical guide slots in the upright framing elements.

Figure 4:
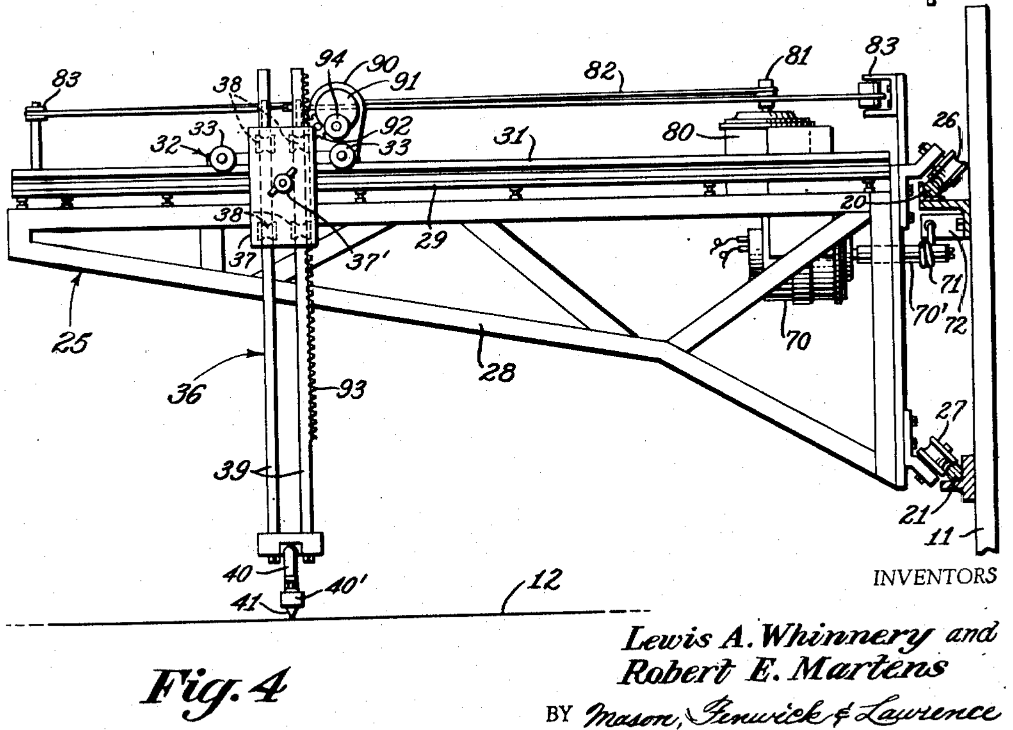
Figure 4 is a side elevation of the assembly illustrated in Figure 3.

To provide transverse movement about the tracing board 12, a traveling cantilever arm indicated generally at 25, is mounted for longitudinal movement on the guide rails 20 and 21 by horizontally aligned pairs of casters 26, 27, projecting from the right-hand end of a truss frame 28, as viewed in Figure 4, forming the body of the traveling arm 25. The upper surface of the truss frame 28 is disposed horizontally and supports a beam 29 on which a pair of guide rails 30 and 31 are arranged in parallel alignment with the transverse axis of the tracing table 12.

A tracer carriage or dolly 32 is provided for movement along the traveling arm 25, and to this end is provided with a plurality of casters 33 extending laterally from a platform 34 to engage the horizontal transversely aligned guide rails 30 and 31 and support the carriage 32 for movement therealong. A caster 33' is journaled on a vertical axis and extends downwardly from the platform 34 to engage the side of the rail 30 and steady movement of the carriage 32. A suitable supporting bracket 35 is rigidly mounted on the platform 34 and is provided with a laterally projecting portion extending beyond the side of the traveling arm 25 to support a tracing arm 36 in depending fashion from the carriage 32. To this end, the supporting member 35 is provided with a pair of clamping plates 37 adjustable relative to each other by a screw and wing nut assembly 37' and provided with vertically aligned pairs of spaced casters 38 embedded in the juxtaposed faces of the plates 37 to guide the rods 39 of the tracing arm 36.

The tracing arm 36 depends vertically from the tracer carriage 32 to a point near the surface of the tracing table 12, and is provided with a laterally extending arm 40 intercoupled with the lower ends of the parallel rods 39 and having a coupling element 40' on the end thereof adapted to be selectively intercoupled with the end of the drafting machine arm 17 secured to the parallax bar 15, as viewed in Figure 1, or to house a stylus 41, pointer, or the like, to trace out the elevational contour lines on a topographical map.

Figure 6:
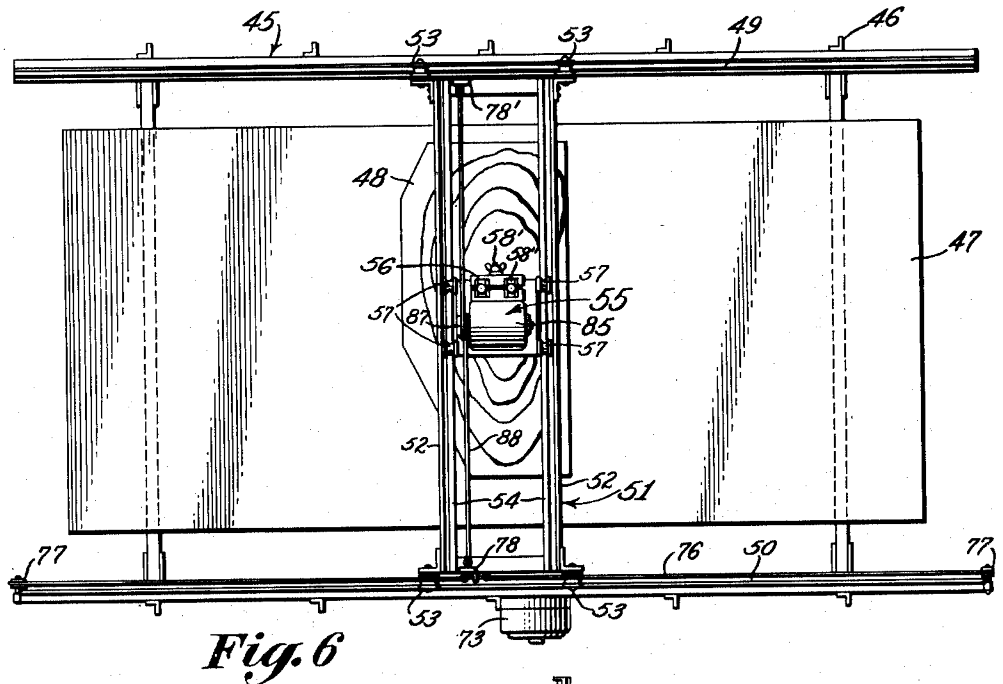
Figure 6 is a top plan view of the reproducing unit.
Figure 7:
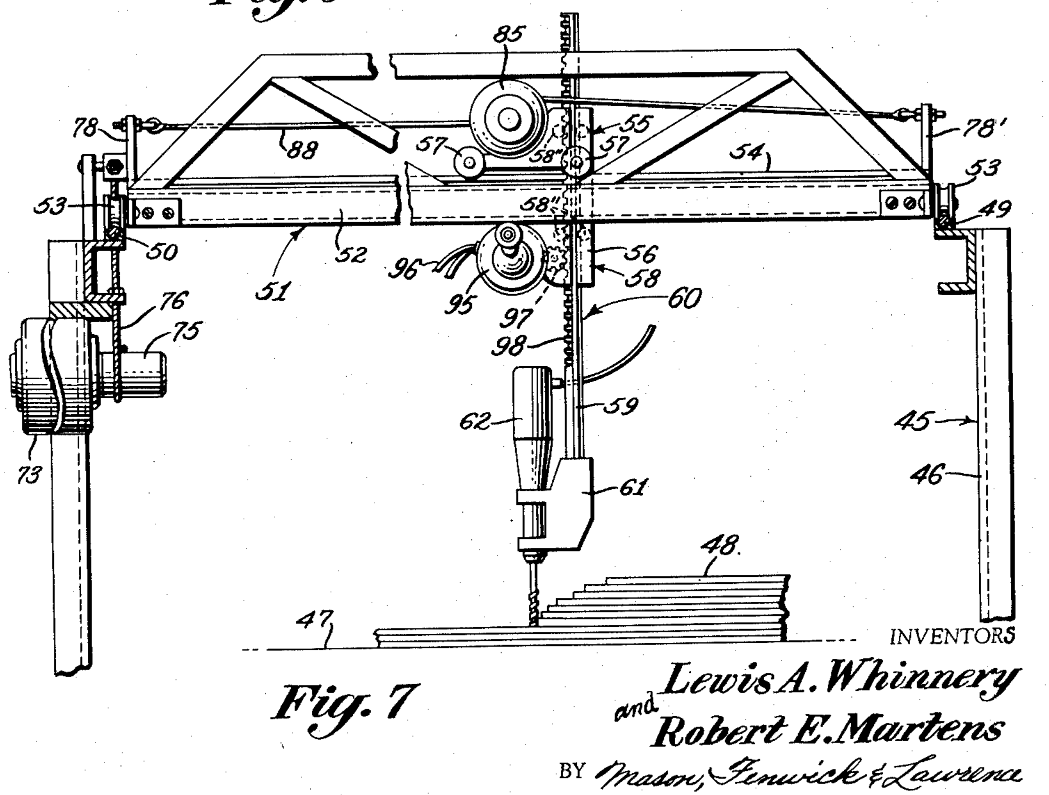
Figure 7 is a side elevation of the traveling bridge assembly forming a part of the reproducing unit illustrated in Figure 2, the guide rails and supporting frames therefor being illustrated in section.

Referring now to Figures 2, 6 and 7, an arrangement is provided in the reproducing unit, generally indicated by the reference character 45 in Figure 2, whereby the longitudinal and transverse coordinates of movement of the tracing arm in the tracing unit 10 are reproduced in the reproducing unit 45. To this end, the reproducing unit 45 comprises a frame 46 adapted to support a horizontally arranged cutting table or work surface 47 on which the work piece 48 is suitably disposed, and a horizontal pair of parallel guide rail members 49 and 50 extending longitudinally along each side of the table 47. The work piece 48 is preferably formed of a series of panels of plastic material, such as commercial expanded acetate plastic compositions, which may be readily cut or drilled, the series of panels being assembled into a block of appropriate thickness suitable to permit scaled reproduction of the range of altitudes encountered in the area of terrain being reproduced.

A traveling bridge or beam 51 extends transversely of the reproducing unit 45 between the horizontal guide rails 49 and 50 for longitudinal movement relative to the cutting table 47. The bridge 51 is constructed of parallel, laterally spaced channel members 52 having casters 53 projecting from both ends thereof adapted to ride on the horizontal guide rails 49 and 50 to permit free longitudinal movement of the traveling bridge 51 therealong, and supports a pair of guide rails 54 extending transversely of the unit 45.

A milling cutter or drill carriage 55 is disposed within the traveling bridge 51 for movement along the length thereof and comprises a clamping bracket 56 and a plurality of laterally extending casters 57 disposed to rest upon the transverse guide rails 54.

The bracket 56 includes a pair of clamping plates indicated generally at 58, one of which is movable relative to the other and adjustable by means of a wing nut assembly indicated at 58', and each of which carry embedded casters 58'' in adjacent faces between which a pair of parallel vertical rods 59 of a drill arm 60 extend. The parallel rods 59 are slidable vertically between the casters 58'' in the clamping plates 58 to permit vertical adjustment of the drill arm 60, the rods 59 having a clamping bracket 61 secured between the lower ends thereof in which a suitable electrically driven milling cutter or drill 62 of conventional type is mounted.

It will be apparent that means have thus been provided in the tracing unit 10 and the reproducing unit 45 for translating movement of the tracing carriage and the milling head carriage into longitudinal and transverse coordinance relative to the corresponding axes of the tracing and cutting tables 12 and 47. Specifically, movement of the tracer stylus 41 transversely of the tracing table 12 effects corresponding movement of the tracer carriage 32 along the guide rails 30 and 31, so that the transverse coordinate of the position of the stylus 41 is apportioned to the position of the carriage 32 along the length of the traveling arm 25. Likewise, movement of the stylus 41 and tracing arm 36 longitudinally of the tracing table 12 effects movement of the tracer carriage 32 and the traveling arm 25 along the guide rails 20, 21 so that the longitudinal coordinate of the position of the stylus 41 is always apportioned to the position of the traveling arm 25 along the length of the guide rails 20, 21.

In like fashion, transverse movement of the drill or milling cutter 62 about the cutting table 47 moves the drill carriage 55 along the guide rails 54 on the traveling bridge 51 so that the transverse coordinate of the position of the drill is apportioned to the position of the carriage 55 along the length of the guide rails 54. Longitudinal movement of the drill 62 and drill arm 60 moves both the carriage 55 and the traveling bridge 51 along the longitudinal guide rails 49 and 50 apportioning the position of the traveling bridge 51 to the longitudinal coordinate of the position of the drill 62.

Means are electrically intercoupled between the tracing unit 10 and the reproducing unit 45 to correlate movement between these rectangular coordinate-determining components of the tracing and reproducing units, so as to duplicate the position of the tracing stylus 41 in the means determining the coordinates of the position of the drill 62.

The means for sensing the longitudinal and transverse axis coordinates of movement of the stylus 41 over the tracing table 12 and translating such movement of the stylus into corresponding or proportioned movements of the coordinate-determining components of the drill or router 62, comprises an electrical intercoupling of position-repeating elements known as selsyns or self-synchronous electric motors. A schematic diagram of such position-repeating selsyn circuits is shown in Figure 8, wherein the element illustrated in dotted lines and indicated by reference character 65 is a selsyn generator or transmitter, comprising a plurality of stator coils indicated schematically by the Y coils at 65′ and a movable rotor coil indicated schematically at 65″. The element illustrated in dotted lines at 66 represents a selsyn motor or receiver having corresponding stator coils indicated schematically by the Y coil 66′, and a rotor coil indicated schematically at 66″. Such a selsyn system operates in well known manner to duplicate in the rotor 66″ of the selsyn motor 66 the orientation of the rotor 65″ in the selsyn generator 65 by intercoupling the corresponding branches of the Y or stator coils 65′ and 66′ as illustrated, and energizing the rotor coils 65′ and 66′ in inphase relation from the same A. C. supply.

Energization of the rotor 65″ in the selsyn generator 65 by an A. C. supply current sets up an electromagnetic field which induces voltages in the stator coil 65′ in relation to the orientation of the axis of the rotor 65″ by means of transformer action. Since the corresponding end of each of the branch coils in the stators of the selsyn generator 65 and selsyn motor 66 are electrically intercoupled, the induced voltages in the respective branches of the stator 65′ are reproduced in the corresponding branches of the stator 66′ in the selsyn motor 66. The stator coils 66′ set up magnetic fields of appropriate amplitude and direction so that a resultant magnetic field in the center of the stator 66′ is set up which has the same direction and, because of losses, somewhat less magnitude than the original field produced by the rotor 65″ of the selsyn generator 65.

It will be apparent that means such as the traveling arm 25 of the tracing unit 10, indicated schematically in Figure 8, may be mechanically intercoupled by means illustrated schematically at 25*a*, with the rotor 65″ of the selsyn generator 65 to orient the rotor 65″ relative to the stator 65′ in correspondence with the position of the traveling arm 25 along the rails 20 and 21. This will produce corresponding rotation of the rotor 66′ in the selsyn motor 66, so that if the rotor 66′ is appropriately mechanically intercoupled with the traveling bridge 51 in the reproducing unit 45 by coupling means indicated schematically at 51*a*, the traveling bridge 51 can be apportionately positioned along the guide rails 49 and 50 in correspondence with the position and movement of the traveling arm 25.

Figures 3, 5:
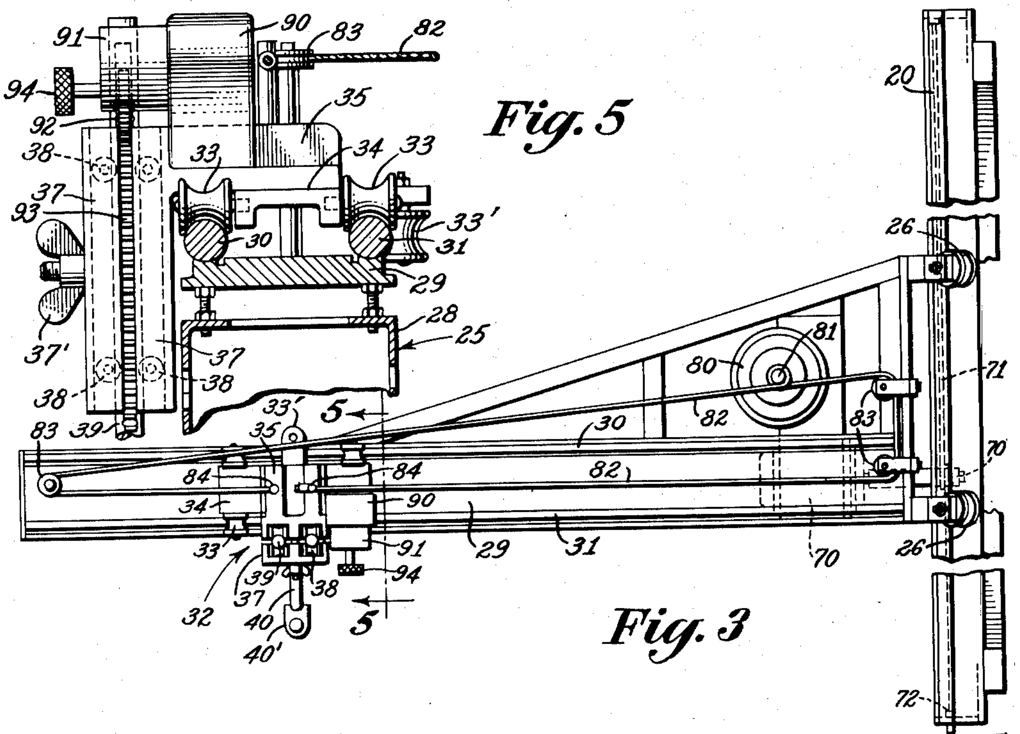
Figure 3 is a top plan view of the traveling cantilever and tracer assembly illustrating in detail the structure for translating the position of the tracer into rectangular coordinates and producing electrical position-sensitive voltages in correspondence with movement of the tracer.
Figure 5 is vertical transverse section through a portion of the cantilever and tracer assembly illustrating details of the tracer carriage, taken along the line 5—5 of Figure 3.

Referring now to the physical components of this position translating system, a selsyn generator, indicated at 70 in Figures 3 and 4, is mounted on the traveling arm 25 within the truss frame 28, and is provided with a shaft 70′ about which a suitable cable 71 is turned, the cable 71 extending between the ends of the guide rail 20 and being anchored to suitable anchor terminals 72 at each end of the guide rail 20. The stator coils of the selsyn generator 70 are intercoupled with corresponding ends of stator coils of a selsyn motor 73 by means of separate leads indicated at 74 in Figure 2. The selsyn motor 73 is rigidly mounted on the frame 46 of the reproducing unit 45, preferably underneath one of the horizontal guide rail members 49, 50, and is provided with a shaft and a drum 75, preferably interchangeable of character, about which a cable 76 is looped for several turns. The cable 76 extends around idler pulleys 77 disposed at each end of the guide rail members 50 in the preferred embodiment, and the two ends of the cable 76 are secured to a suitable anchor element 78 fixed on the traveling bridge 51 at one end thereof.

It will be apparent from this structure that any movement of the tracing stylus 41 relative to the tracing table 12 which has a longitudinal coordinate of movement will effect movement of the traveling arm 25 along the guide rails 20 and 21 in accordance with the longitudinal coordinate of movement of the stylus 41, and that such movement of the traveling arm 25 will impart rotation to the rotor shaft 70′ of the selsyn generator 70 by virtue of its intercoupling with the fixed cable 71. The rotors of the selsyn generator 70 and the selsyn motor 73 intercoupled therewith being energized from an inphase A. C. source, such rotation of the selsyn generator shaft 70′ will produce corresponding rotation of the shaft 75 of the selsyn motor 73, which will drive the cable 76 fixed to the traveling bridge 51 to effect movement of the bridge 51 along the guide rails 49 and 50 in proportion to the movement of the traveling arm 25 determined by the circumference of the shaft 70′ and the drum 75.

To reproduce translation of the transverse coordinance of movement of the stylus 41, a selsyn generator 80 is likewise rigidly mounted on the traveling arm 25 with its rotor shaft 81 extending upwardly along a vertical axis. A cable 82 which is wound tightly for several turns about the shaft 81 is extended around idler pulleys 83 disposed at opposite ends of the traveling arm 25 and the ends of the cable 82 are coupled to anchoring terminals 84 fixed on the tracer carriage 32. The corresponding ends of the stator coils of the selsyn generator 80 are intercoupled with the stator coils of a selsyn motor 85 mounted on the drill carriage 55 by means of separate leads 86. The rotor shaft of the selsyn motor 85 is provided with a drum 87, preferably interchangeable in character, about which several tight turns of a cable 88 are taken. The cable extends along the length of the traveling bridge 51 and is secured at one end to the anchor terminal 78 and at the other end to an anchor terminal 78′.

In like manner, therefore, any movement of the stylus 41 having a transverse coordinate of movement relative to the tracing table 12 effects proportionate movement of the tracing carriage 32 along the length of the traveling arm 25 and produces proportionate rotation of the rotor shaft 81 of the selsyn generator 80. Such rotary movement of the rotor shaft 81 produces corresponding movement of the rotor shaft 87 of the selsyn motor 85 intercoupled therewith which, through the interaction of the rotor shaft drum 87 and the fixed cable 88, effects proportionate movement of the drill carriage 55 and drill 62 along the length of the traveling bridge 51.

To produce vertical movement of the drill arm 60 and drill 62 to determine the appropriate depth of insertion of the drill into the work piece 48, a selsyn generator 90 is mounted on the tracer carriage 32, the rotor of the selsyn generator 90 being intercoupled through a gear box 91 with a pinion 92 engaging a suitable rack 93 extending vertically along the adjacent edge of the rod 39 on the tracing arm 36. A manual control knob 94 is intercoupled through a suitable clutch mechanism in the gear box 91 with the rotor of the selsyn generator 90 whereby the manual control knob 94 can be rotated to effect change in orientation of the rotor of the selsyn generator 90 without driving the pinion 92 to alter the vertical setting of the tracing arm 36. The selsyn generator 90 is electrically intercoupled with a selsyn motor 95 mounted on the bracket 56 of the drill carriage 55, by means of leads 96, the rotor of the selsyn motor 95 being intercoupled with a pinion 97 journaled on the bracket 56 and engaging a rack 98 on one of the rods 59 of the drill arm 60.

In operation of the vertical adjustment system for the drill arm 60, if the relief model is being derived from a topographical map or from parallax analysis of a pair of aerial photographs, the manual control knob 94 is positioned axially to disengage the rotor of the selsyn generator 90 from the pinion 92 so that the tracer arm 36 may remain fixed, and the manual control knob 94 is manually rotated through preselected increments when the stylus 41 is to be traced along contour lines of different elevations, in accordance with the elevation noted on the topographical chart, or in accordance with different settings of the micrometer on the parallax bar 15. The rotation of the rotor of the selsyn generator 90 effects a corresponding rotation of the rotor of the selsyn motor 95 electrically intercoupled therewith to appropriately alter the vertical position of the drill arm 60 and drill 62 by means of the drive derived through the pinion and rack 97 and 98, respectively.

If the relief model is being derived from another relief model, the manual control knob 94 will be adjusted to couple the rotor shaft of the selsyn generator 90 with the pinion 92, so that when the stylus 41 is scanned along parallel grid lines to cover the surface of the master relief model, vertical movements of the tracer arm 36 when the stylus 41 travels over the surface of the master model in contact therewith will effect corresponding rotation of the rotor of selsyn generator 90 through the rack and pinion 93, 92, to produce corresponding movement of the drill 62 and drill arm 60.

By means of the above arrangement, when it is desired to produce a 3-dimensional relief model of an area of terrain from a previously prepared topographical map showing the incremental elevation contour lines, the stylus 41 will be traced over each of the incremental contour lines with an appropriate setting manually set into the rotor of the vertical axis selsyn generator 90 by the manual control knob 94, producing appropriate vertical adjustment of the drill 62 through the selsyn motor 95. The longitudinal coordinates of movement of the stylus 41 will be translated through the selsyn generator 70 whose rotor is positioned in correspondence with movement of the traveling arm 25 along the guide rails 20 and 21 to produce corresponding or proportionate movement of the traveling bridge 51 along the horizontal guide rails 49 and 50 through the selsyn motor 73. Likewise, the transverse coordinates of movement of the stylus 41 will be translated to the reproducing unit 45 by means of the intercoupled selsyn generator 80 and selsyn motor 85, the rotation of the rotor of the selsyn generator 80 on the transverse movement of the tracer carriage 32 producing corresponding or proportioned transverse movement of the drill carriage 55 and drill 62 along the traveling bridge 51. When the entire group of incremental elevation contour lines on the topographical map have been traced, the block of plastic material 48 forming the work piece will have been cut out by the drill 62 in proper relation to duplicate the contours of the area of terrain in proper 3-dimensional scale.

If the 3-dimensional relief model is to be constructed from parallax analysis of a stereoscopic pair of aerial photographs, such as photographs 13, the coupling member 40' is coupled with the end of the universal drafting arm 36, the manual control knob 94 of the selsyn generator 90 is manually adjusted in correspondence with micrometer settings of the parallax bar 15, and movements of the parallax bar within the field of the stereoscopic 44 and over the pair of photographs 13 effects translation of such movement into longitudinal and transverse coordinates which are reproduced by the intercoupled selsyns on the tracing and reproducing units and produce proper movement of the drill 62 relative to the plastic block 48. The 3-dimensional relief model of the area being examined is thus cut out in a similar manner to that occurring when the model is derived from a topographical map. In this particular case, however, a topographical map, illustrated at 16 in Figure 1, is simultaneously produced with the production of the relief model, by means of the arm 15' on the parallax bar 15.

The present apparatus for production of 3-dimensional relief models, is not limited to production of a single relief model while the topographical map, aerial photographs, or the master relief model, are being scanned. It will be apparent that a plurality of units identical to the reproducing unit 45, can be intercoupled with the single tracing unit 10, with longitudinal transverse and vertical control selsyn motors of each reproducing unit 45 coupled in parallel with the longitudinal transverse and vertical selsyn motors on the tracing unit 10, so that a plurality of reproducing units 45 can be operated simultaneously. By providing drums on the shafts of the selsyn motors in the different reproducing units 45 which are of different circumferences relative to the rotor shafts of the selyn generators in the tracing unit 10, a plurality of relief models of different scales will be simultaneously constructed during scanning of the single plot from which the relief models are to be derived.

From the above description it will be apparent that novel means for producing 3-dimensional relief models of an area of terrain has been devised, wherein 3-dimensional relief models can be derived by tracing a previously prepared topographical map, by parallax analysis of a stereoscopic pair of aerial photographs of the terrain, or by scanning a master relief model. This system is so arranged that no complex mechanical intercouplings are required between the tracing and reproducing units to effect translation of tracing movements to the reproducing unit. Further, by employing an electrical intercoupling between the units for translating longitudinal, transverse and vertical coordinates of movement of the tracer, a convenient method is available of effecting desired variations in scaling between the relief model and the plot from which the model is derived, and wherein a plurality of relief models of varying scales can be simultaneously produced during scanning of a single plot from which the models are to be derived. Further, the present system permits the attainment of the long desired end of producing 3-dimensional relief models of terrain directly from the stereoscopic pair of aerial photographs without requiring a topographical map to be previously prepared, and effects the simultaneous production of the topographical map of the area of terrain during production of the 3-dimensional relief model.

While but one embodiment of the invention has been particularly shown and described, it is distinctly understood that the invention is not limited thereto but that various modifications may be made without departing from the spirit and scope thereof, and it is desired, therefore, that only such limitations shall be placed thereon as are imposed by the prior art and are set forth in the appended claims.

We claim:

1. Apparatus for producing relief models from flat reproductions of terrain comprising first perpendicularly related horizontally disposed guide means one of which is movable relative to the other, a tracer arm guidingly supported on the movable guide means, said tracer arm having coupling means at one end thereof to be connected to parallax bars and tracing stylus to follow movement thereof over elevational contour lines derived from the flat reproductions, self-synchronous generators mechanically connected to said tracer arm and guide means to be conditioned each in proportion to a rectangular component of movements of said tracing member along one of two perpendicular reference axes, a follower tool, second perpendicularly related horizontally disposed guide means supporting said follower tool for movement along coordinate horizontal axes, self-synchronous motors mechanically connected to said follower tool, means electrically intercoupling said self-synchronous generators and said self-synchronous motors to drive said follower tool in correspondence with the movements of said tracer arm, self-synchronous motors mechanically connected to said follower tool to drive the same along a vertical axis, self-synchronous generator means electrically intercoupled with said last mentioned self-synchronous motor means, and means for manually shifting said last mentioned self-synchronous generator means in preselected increments corresponding with the values of elevational contour lines and parallax bar adjustments to vertically adjust said follower tool to proportionate vertical positions.

2. Apparatus for producing relief models from flat reproductions of terrain comprising a tracing unit having a rectangular supporting panel for supporting flat contour map and stereoscopic photographic reproductions of terrain, elongated horizontal guide means along one edge of said panel in elevated position relative thereto, a cantilever arm guidingly supported at one end by said guide means in overlying relation across said panel and having horizontal guide means thereon perpendicularly related to said first mentioned guide means, and a tracer arm guidingly supported by said second mentioned guide means in a vertical position for movement along the length of said cantilever arm, said tracer arm having coupling means at the lower end thereof to be connected to parallax bars and tracing stylus to follow movement thereof over elevational contour lines derived from the flat reproductions, self-synchronous generators in said tracer unit mechanically connected to said tracer arm and said cantilever arm to follow movements thereof along said guide means, a follower tool, a work-supporting surface, perpendicularly related guide means supporting said follower tool for movement along coordinate axes of said work-supporting surface, self-synchronous motors mechanically connected to said follower tool, means electrically intercoupling said self-synchronous generators and self-synchronous motors to drive said follower tool along said coordinate axes in correspondence with the movements of said tracer arm, self-synchronous motor means mechanically connected to said follower tool to continuously control the vertical disposition thereof, self-synchronous generator means electrically intercoupled with said last mentioned self-synchronous motor means and supported on said tracing unit, and means for manually shifting said last mentioned self-synchronous generator means in preselected increments corresponding with the values of contour map lines and parallax bar adjustments to vertically adjust said follower tool to appropriate depths of cut.

ROBERT E. MARTENS.
LEWIS A. WHINNERY.

References Cited in the file of this patent

UNITED STATES PATENTS

| Number | Name | Date |
|---|---|---|
| 2,047,013 | Dorn | July 7, 1936 |
| 2,099,612 | Limeses et al. | Nov. 16, 1937 |
| 2,172,313 | Young | Sept. 5, 1939 |
| 2,307,503 | Gulliksen | Jan. 5, 1943 |
| 2,330,647 | Volk | Sept. 28, 1943 |
| 2,335,127 | Ling | Nov. 23, 1943 |
| 2,386,816 | Scholz | Oct. 16, 1945 |
| 2,494,663 | Lobosco | Jan. 17, 1950 |
| 2,511,956 | Wetzel | June 20, 1950 |
| 2,559,575 | Fryklund et al. | July 3, 1951 |

FOREIGN PATENTS

| Number | Country | Date |
|---|---|---|
| 417,663 | Great Britain | Oct. 8, 1934 |